US008504564B2

(12) United States Patent
Chang et al.

(10) Patent No.: US 8,504,564 B2
(45) Date of Patent: Aug. 6, 2013

(54) SEMANTIC ANALYSIS OF DOCUMENTS TO RANK TERMS

(75) Inventors: Walter Chang, San Jose, CA (US); Nadia Ghamrawi, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/968,326

(22) Filed: Dec. 15, 2010

(65) Prior Publication Data
US 2011/0082863 A1   Apr. 7, 2011

Related U.S. Application Data

(63) Continuation of application No. 11/728,748, filed on Mar. 27, 2007, now Pat. No. 7,873,640.

(51) Int. Cl.
*G06F 17/30* (2006.01)

(52) U.S. Cl.
USPC ............ 707/730; 707/739; 707/749; 707/750

(58) Field of Classification Search
USPC .................. 707/730–731, 738–739, 749, 750
See application file for complete search history.

(56) References Cited

U.S. PATENT DOCUMENTS

| | | | |
|---|---|---|---|
| 5,384,703 A * | 1/1995 | Withgott et al. ............... | 715/236 |
| 5,642,518 A | 6/1997 | Kiyama et al. | |
| 5,675,819 A | 10/1997 | Schuetze | |
| 5,687,364 A | 11/1997 | Saund et al. | |
| 5,745,602 A | 4/1998 | Chen et al. | |
| 5,819,258 A * | 10/1998 | Vaithyanathan et al. ...... | 707/692 |
| 5,937,422 A | 8/1999 | Nelson et al. | |
| 6,081,774 A * | 6/2000 | de Hita et al. ..................... | 704/9 |
| 6,125,362 A | 9/2000 | Elworthy | |
| 6,137,911 A * | 10/2000 | Zhilyaev ....................... | 382/225 |
| 6,161,084 A * | 12/2000 | Messerly et al. .................. | 704/9 |
| 6,173,251 B1 | 1/2001 | Ito et al. | |
| 6,189,002 B1 * | 2/2001 | Roitblat ................................ | 1/1 |
| 6,246,977 B1 * | 6/2001 | Messerly et al. .................. | 704/9 |
| 6,389,412 B1 * | 5/2002 | Light ............................ | 707/825 |
| 6,470,307 B1 | 10/2002 | Turney | |
| 6,480,835 B1 * | 11/2002 | Light ............................ | 707/707 |
| 6,638,317 B2 | 10/2003 | Nakao | |
| 6,850,937 B1 * | 2/2005 | Hisamitsu et al. ............ | 707/750 |
| 6,904,564 B1 | 6/2005 | Harris et al. | |

(Continued)

OTHER PUBLICATIONS

U.S. Appl. No. 11/728,748, Non-Final Office Action dated Sep. 9, 2009.

(Continued)

*Primary Examiner* — Hanh Thai
(74) *Attorney, Agent, or Firm* — Kilpatrick Townsend & Stockton LLP (57) ABSTRACT

A method, apparatus and computer program product provides for a semantic analyzer to produce and rank semantic terms to reflect their relationship to the theme and topics of a document. The text and the document can have no relationship to any pre-selected keywords before the semantic analyzer performs text extraction. The semantic analyzer extracts text from a document and performs semantic analysis on the extracted text. The semantic analyzer provides a plurality of ranked semantic terms as a result of the semantic analysis and associates semantic terms with the document as semantic keywords. The semantic terms define content to be presented with the document where the content is an advertisement, a link to a remote information resource or a second document.

19 Claims, 6 Drawing Sheets

U.S. PATENT DOCUMENTS

| | | | |
|---|---|---|---|
| 6,961,954 B1 | 11/2005 | Maybury et al. | |
| 6,965,900 B2 | 11/2005 | Srinivasa et al. | |
| 6,990,496 B1 | 1/2006 | McGee et al. | |
| 6,996,634 B1 | 2/2006 | Herrod et al. | |
| 7,003,511 B1 | 2/2006 | Antonov | |
| 7,395,501 B2 | 7/2008 | Graham et al. | |
| 7,433,893 B2* | 10/2008 | Lowry | 1/1 |
| 7,478,089 B2 | 1/2009 | Henkin et al. | |
| 7,752,200 B2 | 7/2010 | Scholl et al. | |
| 7,752,204 B2* | 7/2010 | Kao et al. | 707/736 |
| 7,873,640 B2 | 1/2011 | Chang et al. | |
| 2002/0042793 A1* | 4/2002 | Choi | 707/6 |
| 2003/0182631 A1 | 9/2003 | Tsochantaridis et al. | |
| 2003/0225749 A1* | 12/2003 | Cox et al. | 707/3 |
| 2004/0064438 A1 | 4/2004 | Kostoff | |
| 2004/0181525 A1 | 9/2004 | Itzhak et al. | |
| 2004/0236729 A1* | 11/2004 | Dingledine et al. | 707/3 |
| 2005/0022115 A1* | 1/2005 | Baumgartner et al. | 715/513 |
| 2005/0119873 A1 | 6/2005 | Chaney et al. | |
| 2005/0131935 A1* | 6/2005 | O'Leary et al. | 707/102 |
| 2005/0137939 A1 | 6/2005 | Calabria et al. | |
| 2005/0198070 A1* | 9/2005 | Lowry | 707/104.1 |
| 2006/0167857 A1* | 7/2006 | Kraft et al. | 707/3 |
| 2006/0212469 A1 | 9/2006 | Babanov et al. | |
| 2006/0217953 A1* | 9/2006 | Parikh | 704/1 |
| 2006/0218114 A1* | 9/2006 | Weare et al. | 707/1 |
| 2007/0016848 A1 | 1/2007 | Rosenoff et al. | |
| 2007/0073745 A1* | 3/2007 | Scott et al. | 707/100 |
| 2007/0083506 A1* | 4/2007 | Liddell et al. | 707/5 |
| 2007/0112764 A1 | 5/2007 | Yih et al. | |
| 2007/0217676 A1* | 9/2007 | Grauman et al. | 382/170 |
| 2007/0220023 A1* | 9/2007 | Dean et al. | 707/101 |
| 2008/0086453 A1* | 4/2008 | Fabian | 707/3 |
| 2008/0195595 A1* | 8/2008 | Masuyama et al. | 707/5 |
| 2009/0070101 A1* | 3/2009 | Masuyama et al. | 704/9 |

OTHER PUBLICATIONS

U.S. Appl. No. 11/728,748, Interview Summary dated Oct. 28, 2009.
U.S. Appl. No. 11/728,748, Final Office Action dated Mar. 9, 2010.
U.S. Appl. No. 11/728,748, Advisory Action dated May 27, 2010.
U.S. Appl. No. 11/728,748, Advisory Action dated Jun. 16, 2010.
U.S. Appl. No. 11/728,748, Notice of Allowance dated Sep. 10, 2010.
International Application No. PCT/US08/56934, International Search Report and Written Opinion dated Aug. 8, 2008.
Gonenc, Ercan "Automated Text Summarization and Keyphrase Extraction", A thesis submitted to the computer engineering and the institute of engineering and science of Bilken University in partial fulfillment of the requirements for the degree of master of science, 2006.
Gong, et al., "Generic Text Summarization Using Relevance Measure and Latent Semantic Analysis", NEC USA, C&C Research Laboratories, 2001.
Turney, Peter D. "Learning Algorithms for Keyphrase Extraction", Institute for Information Technology, National Research Council of Canada, 1999.
Witten, et al., "KEA: Practical Automatic Keyphrase Extraction", Department of Computer Science, Univeristy of Waikato, 1999.

* cited by examiner

SEMANTIC ANALYSIS OF DOCUMENTS TO RANK TERMS

CROSS-REFERENCE TO RELATED APPLICATION

This application is a continuation of U.S. patent application Ser. No. 11/728,748 filed on Mar. 27, 2007, which has been issued as U.S. Pat. No. 7,873,640, the contents of which are incorporated herein by this reference.

BACKGROUND

Conventional technologies for presenting advertisements to potential customers provide a variety of mediums in which to present those advertisements. People can put advertisements in their non-website content documents presently by selling space within the document, similar to how a magazine publisher would sell advertisement space in their magazine. Advertisements can also be displayed on web sites, for example, via an advertisement banner. Additionally, advertisements can be displayed on search engines via a sponsored advertisement. In targeted advertising, advertisers pay for the advertisements by choosing keywords or keyword phrases, and competing against other advertisers who also want their advertisements to appear on web sites relevant to those keywords or keyword phrases.

When an end user enters a web site containing advertisements, the advertisements (for which the advertisers have bid on keyword or keyword phrases) are displayed. The displaying of the advertisements is referred to as an 'impression'. The advertisers do not pay for impressions. Instead, advertisers bid on "keywords" that they believe their target customers would most likely type in the search bar in order to find their type of product or service. When an end user selects (i.e., "clicks") on an advertisement, the advertiser is charged for that selection. The advertiser is charged whatever amount the advertiser bid on the keyword or keyword phrase that caused the displaying (i.e., impression) of the advertisement. Each time an end user clicks on the advertisement, the advertiser is charged for that selection. For example, if an advertiser sells blue dots, the advertiser would bid on the keyword "blue dots", with the expectation that a user would type those words in the search bar, see their ad, click on it and eventually make a purchase. These ads are called "sponsored links" or "sponsored ads" and appear next to and sometimes above the search results on the search engine's webpage. This is known as "pay per click" since the advertiser only pays for the advertisement when an end user selects (i.e., "clicks") on the advertisement. Web site owners also receive a small amount of revenue each time an end user selects (i.e., "clicks") on an advertisement that appears on the web site owner's web site.

SUMMARY

Conventional computer systems suffer from a variety of deficiencies. For example, such conventional systems (e.g. conventional advertising content serving systems) require manual entry of keywords to be utilized to determine advertisement relevance. Specifically, search engines often rely on webmaster-provided information such as a keyword meta tag. Here, a webmaster can submit a webpage, or URI (uniform resource indentifier), to a desired search engine which sends a spider to "crawl" that page, extract links to other pages from it, and index information found on the page. A search engine spider downloads the page and stores it on the search engine's own server, where a second program, known as an indexer, extracts various information about the page. Indexing pages based upon meta data is not very reliable because often webmasters abuse the use of submitted meta tags by including irrelevant keywords to artificially increase page impressions for their website and to increase their ad revenue. This results in allowing webmasters to negatively effect the reputation of a search engine by creating conditions for irrelevant searches and searches with inaccurate search result rankings.

Another deficiency observed with conventional systems is the matching of user queries (or user-created email text) against advertisement keywords collected from a pool of advertisers. In order to implement such a technique, conventional search engines rely on data mining over a massive content search infrastructure. Maintaining the infrastructure can be costly and complicated as the amount of data being stored significantly increases over time. This is especially true since the complex associations and data relationships with pre-determined advertisement keywords are required to effectively mine data must also be created and stored but still be readily accessible and promptly processed in response to user queries.

Techniques discussed herein significantly overcome the deficiencies of conventional applications such as those discussed above as well as additional techniques also known in the prior art. As will be discussed further, certain specific embodiments herein are directed to a semantic analyzer. The one or more embodiments of the semantic analyzer as described herein contrast with conventional systems to allow for automatically analyzing documents to identify keywords.

For example, a user can have a large document that requires keywords in order to ensure that advertisements relevant to the document's content will be presented with the document. The user is not the author of the document and only has cursory knowledge as to the subject matter of the document's content. Nonetheless, the user intends to select keywords that will provide advertising that properly reflects the topic and themes of the document. In one embodiment, the semantic analyzer can automatically provide such keywords to the user.

Instead of the user wasting time reading the entire document, the semantic analyzer automatically analyzes terms in the document and estimates the relevance of the terms to the document's contents. The semantic analyzer extracts all occurrences (i.e. mentions) of the term (where a term is a group of one or more juxtaposed words, punctuation, numbers and/or abbreviations), performs statistical functions (or calculations) on the extracted terms and produces a statistical ranking of distinct semantic terms based on how relevant they are to the subject matter of the document's content.

The semantic analyzer allows the user to review and edit the list of semantic terms based on how well they return ads. Once the user has previewed how well the semantic terms return ads, the semantic analyzer allows the user to associate desired semantic terms back into the document as semantic keywords.

Thus, the semantic analyzer provides the user with the advantage of determining keywords from a listing ranked semantic terms that are based on text extracted from the document regardless of the user's understanding of the subject matter of the document. Also, the user is allowed a preview of how certain semantic terms will actually perform when presenting advertisements with the document.

Specifically, the semantic analyzer ranks semantic terms to reflect their relationship to the theme and topics of a document. The text and the document can have no relationship to any pre-selected keywords before the semantic analyzer performs text extraction. The semantic analyzer extracts text from the document and performs semantic analysis on the extracted text. The semantic analyzer provides a plurality of ranked semantic terms as a result of the semantic analysis and associates semantic terms with the document as semantic keywords. The semantic terms define content to be presented with the document where the content is an advertisement, a link to a remote information resource or a second document.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif., U.S.A., herein after referred to as "Adobe" and "Adobe Systems."

BRIEF DESCRIPTION OF THE DRAWINGS

The foregoing and other objects, features and advantages of the invention will be apparent from the following more particular description of embodiments of the methods and apparatus for a semantic analyzer configured to provide a ranked list of semantic terms that reflect the theme and topics of a document, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

According to embodiments herein, a semantic analyzer is configured to provide a ranked list of semantic terms that reflect the theme and topics of a document. Such ranked semantic terms can be selected by a user to be keywords for the document. Specifically, the text and the document can have no relationship to any pre-selected keywords before the semantic analyzer performs text extraction. The semantic analyzer extracts text from the document and performs semantic analysis on the extracted text. The semantic analyzer provides a plurality of ranked semantic terms as a result of the semantic analysis and associates semantic terms with the document as semantic keywords. The semantic terms define content to be presented with the document where the content is an advertisement, a link to a remote information resource or a second document.

It is understood that a token is any string consisting of a word from the document (misspelled or fictitious), as well as characters from punctuation, abbreviations, and numbers, etc. A term can be a contiguous grouping of tokens, such as two or three words. Further, a mention is an instance of a term in the document, or in other words, an individual occurrence of the term in the document. A keyword is a word or concept with special significance such as a term that has been set apart or designated as having special significance. The semantic analyzer ranks terms found in the document according to an associated score derived by calculations of the semantic analyzer. The semantic analyzer then provides a user with opportunity to preview the ranked terms and select which of the ranked terms can be used as keywords for the document.

Figure 1:
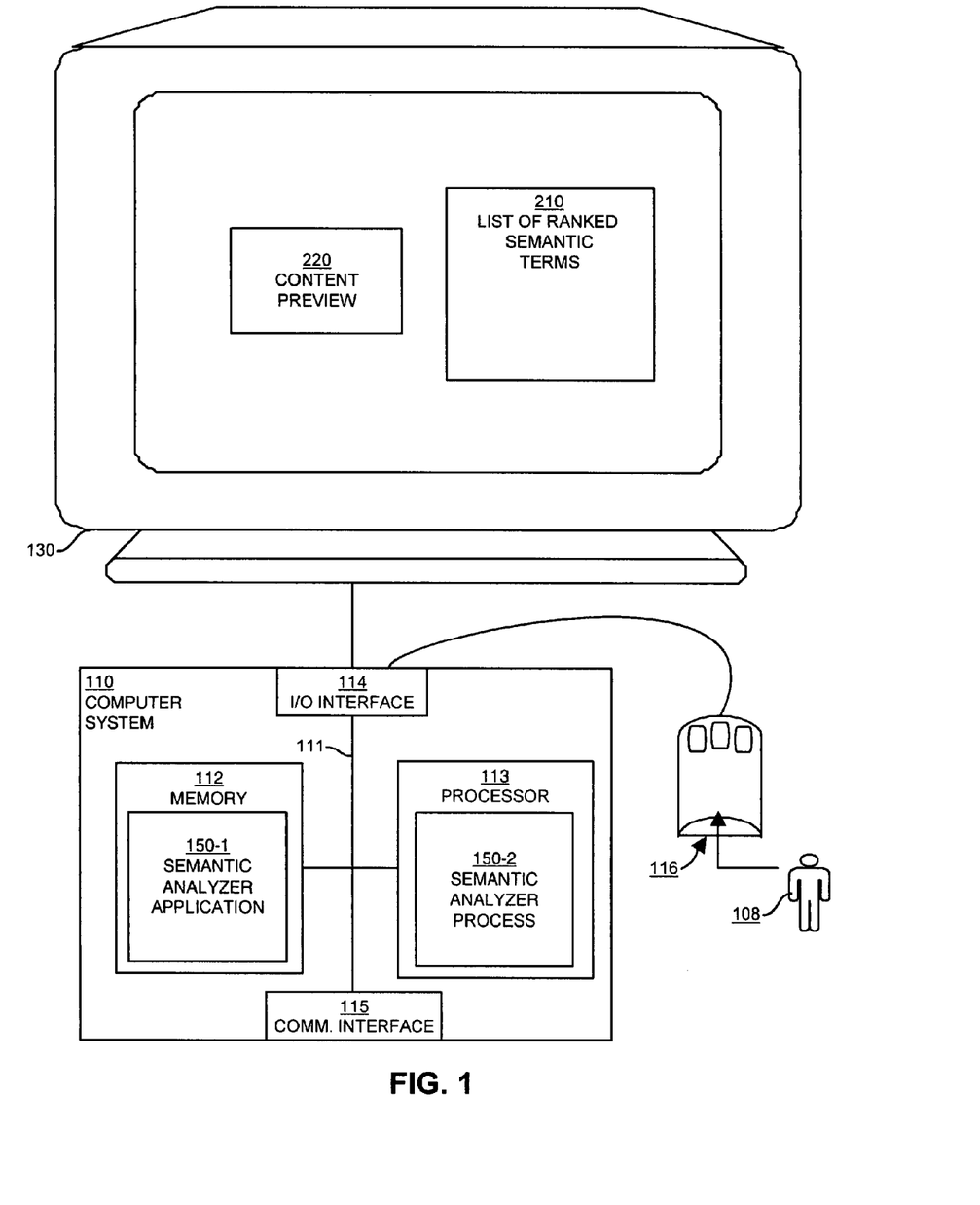
FIG. 1 is a block diagram of the computer system configured with a semantic analyzer according to embodiments herein.

Turning now to FIG. 1, a block diagram illustrates an example of architecture for a computer system 110 that executes, runs, interprets, operates or otherwise performs a semantic analyzer application 150-1 and/or semantic analyzer process 150-2 (e.g. an executing version of the application 150-1 controlled by user 108) according to embodiments herein. The computer system 110 may be any type of computerized device such as a personal computer, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130. An input device 116 (e.g., one or more user/developer controlled devices such as a keyboard, mouse, touch pad, etc.) couples to the computer system 110 and processor 113 through an input/output (I/O) interface 114.

The memory system 112 can be any type of computer readable medium and, in this example, is encoded with a self-enclosed timeline trimmer application 150-1 that supports generation, display, and implementation of functional operations as will be further explained herein. For example, a list of ranked semantic terms 210 can be provided at the display 130. Further, a content preview 220 can be provided in response to the user 108 selecting one or more semantic terms from the list of ranked semantic terms 210.

During operation of the computer system 110, the processor 113 accesses the memory system 112 via the interconnect 111 in order to launch, run, execute, interpret or otherwise perform the logic instructions of the semantic analyzer application 150-1. Execution of the semantic analyzer application 150-1 in this manner produces the semantic analyzer process 150-2. In other words, the semantic analyzer process 150-2 represents one or more portions or runtime instances of the semantic analyzer application 150-1 (or the entire application 150-1) performing or executing within or upon the processor 113 in the computerized device 110 at runtime.

Figure 2:
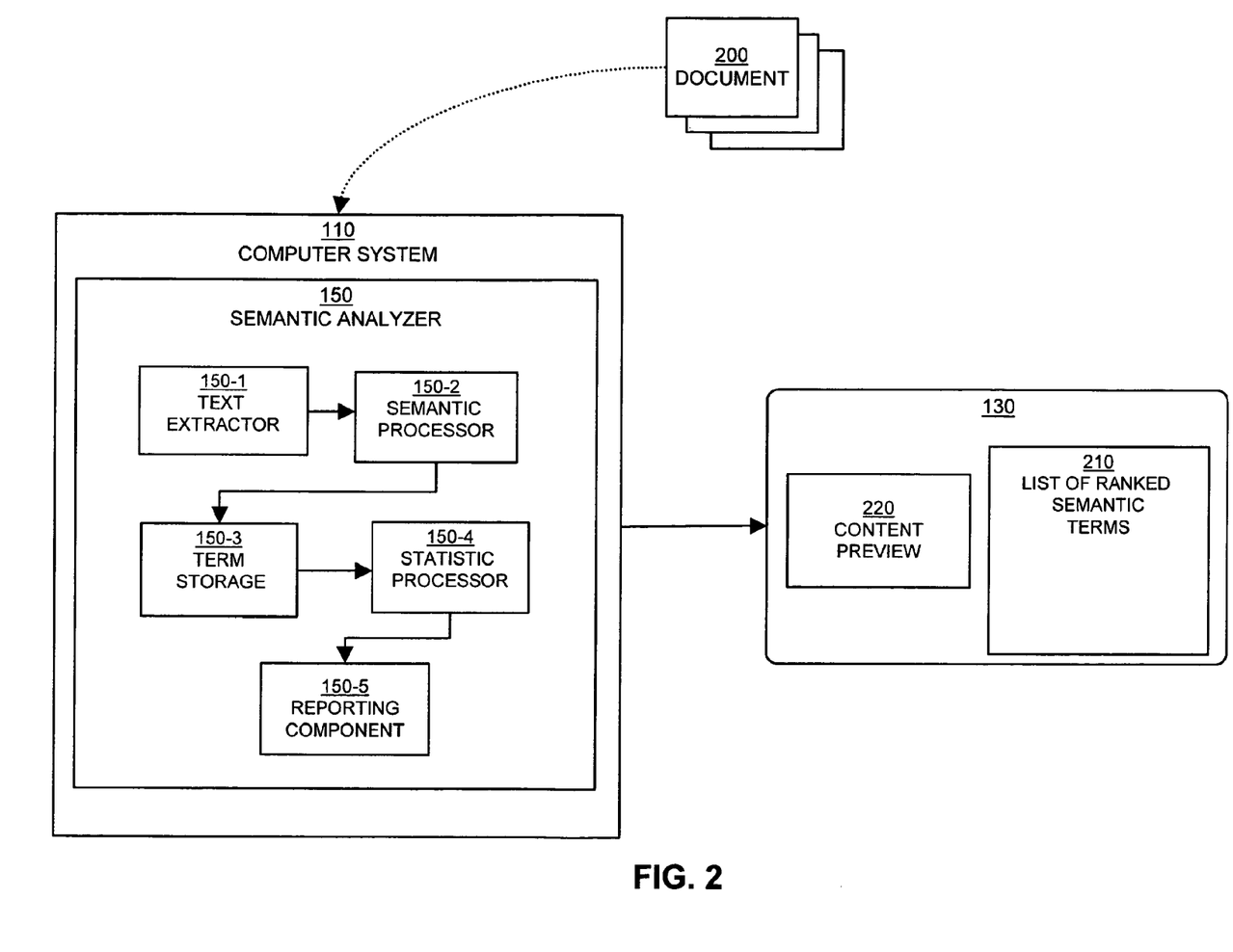
FIG. 2 is a block diagram of the computer system configured with a semantic analyzer according to embodiments herein.

Regarding FIG. 2, a block diagram of the computer system 110 configured with a semantic analyzer 150 according to embodiments herein is illustrated. The semantic analyzer 150 includes a text extractor 150-1, a semantic processor 150-2, term storage 150-3, a statistic processor 150-4, and a reporting component 150-5. Additionally, the computer system 100 includes a display 130 to provide a view of a ranked list 210 of semantic terms for a document 200 and a preview 220 of content defined by selected semantic terms.

Once the document 200 is submitted to the computer system 110, it is processed by the semantic analyzer 150. Initially, the text extractor 150-1 extracts plain text from the document 200 using, for example, standard open-source text extraction. It is understood that plain text can refer to textual data in ASCII format. Plain text can be a portable format supported by nearly every application on every machine and computer which does not contain any formatting commands. Next, the plain text is submitted to the semantic processor 150-2.

The semantic processor 150-2 can include one or more term, mention and theme extractors. The semantic processor 150-2 can additionally include tokenizers with stopword elimination to extract a sequence of tokens from document text and to remove trivial words (e.g. trivial text, trivial text strings) such as prepositions, determiners and logical operators. The semantic processor 150-2 identifies tokens, terms, counts the individual occurrences (i.e. mentions) of terms and tokens and remembers the position in the document of each mention for each term starting (i.e. mention offset).

In the term storage 150-3, all extracted semantic terms, mentions and themes can be stored into a set of normalized relational database tables to allow efficient statistical processing over extracted data. For example, in one embodiment, the relational schema can store one mention/theme per row to allow for ranking processing using SQL statistical and analytic functions.

Further, in the statistic processor 150-4, several statistical ranking functions can be applied to all terms extracted from the document 200 to determine the most relevant and important semantic terms. It is understood that different statistical and ranking methods can be suited for certain types of document content. Thus, the semantic analyzer 150 provides semantic terms for various types of documents. Such types of documents include, but are not limited to, long articles such as news stories with one central theme and a smaller number of subtopics. Technical Journals and Technical Articles such as conference and journal proceedings with significant domain vocabulary and well-known document structure (Abstract, Intro, Conclusion, References, etc.). E-mail, letters, and announcements that are characterized by less document structure and may have many different ideas of equal importance.

Finally, in the reporting component 150-5, a ranked listing 210 of the semantic terms is created according to statistical data. A view of the ranked list 210 is created and provided to the user 108 via the display 130. The semantic analyzer 150 allows the user 108 to test which of the ranked semantic terms are best for the document 200. Via the reporting component 150-5, the user 108 selects one or more of the semantic terms from the listing 210. A content preview 220 is created and displayed to the user. The content preview 220 shows the user an aggregate view of the content defined by the selected semantic terms.

Figure 3:
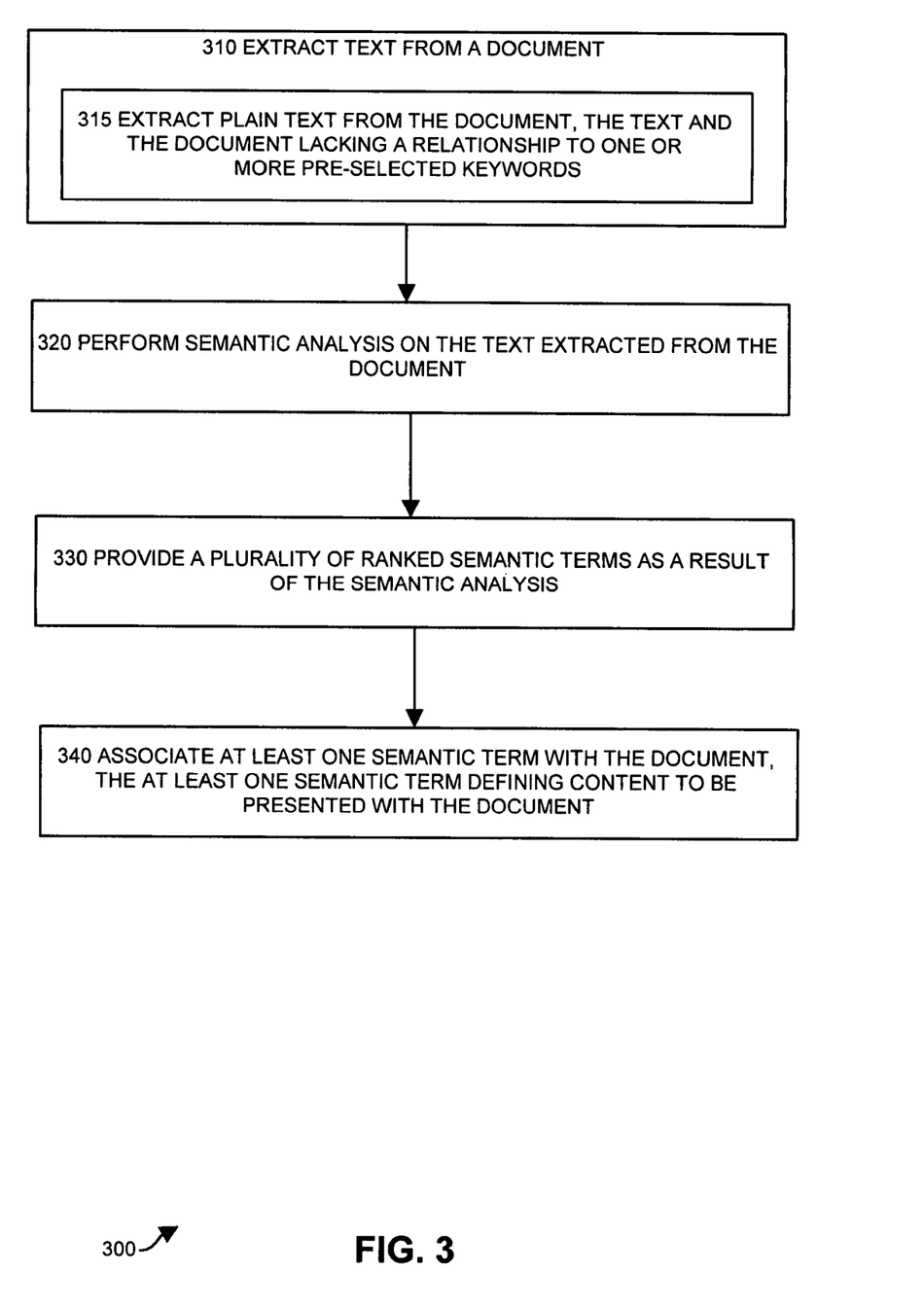
FIG. 3 is a flowchart of processing steps performed by the semantic analyzer.

FIG. 3 is a flowchart 300 of processing steps 310-340 performed by the semantic analyzer 150. The steps in flowchart 300 relate to the features as illustrated in the block diagram of FIG. 2. The semantic analyzer 150 (e.g., semantic analyzer application 150-1 and/or semantic analyzer process 150-2 in FIG. 1) automatically analyzes documents to rank terms by semantic relevance. In particular, at step 310, the semantic analyzer 150 extracts text from a document 200 and, at step 315, plain text is extracted from the document 200. It is understood that the text and the document 200 lack a relationship to one or more pre-selected keywords prior to the text extraction. At step 320, the semantic analyzer 150 performs semantic analysis on the extracted text. At step 330, the semantic analyzer 150 provides a plurality of ranked semantic terms as a result of the semantic analysis and, at step 340, associates semantic terms with the document 200. The semantic terms define content to be presented with the document 200 where the content is an advertisement, a link to a remote information resource or a second document.

Figure 4:
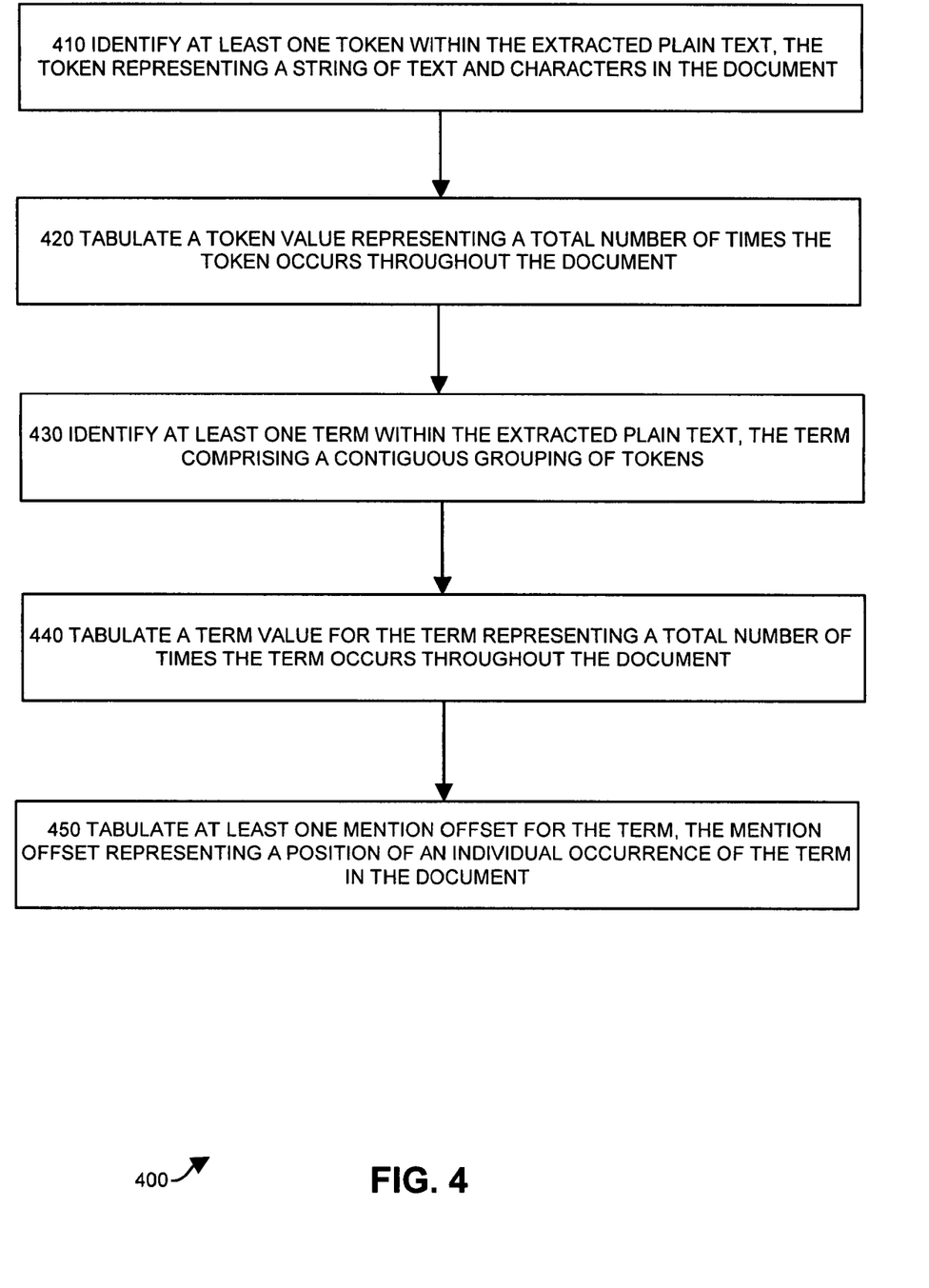
FIG. 4 is a flowchart of processing steps performed by the semantic analyzer for semantic processing of extracted text according to embodiments herein.

FIG. 4 is a flowchart 400 of processing steps 410-450 performed by the semantic analyzer 150 for semantic processing of extracted text according to embodiments herein. The steps in flowchart 400 relate to the semantic processor 150-2 as illustrated in the block diagram of FIG. 2. At step 410, the semantic analyzer 150 identifies at least one token within the extracted plain text, the token representing a string of text and characters in the document. In particular, the semantic analyzer 150 retains tokens (e.g. words in the document 200) based on their occurrence in the document 200. However punctuation, mathematical symbols, numbers, prepositions, determiners and logical operators need not be retained.

At step 420, the semantic analyzer 150 tabulates a token value representing a total number of times the token occurs throughout the document. At step 430, the semantic analyzer 150 identifies at least one term within the extracted plain text, the term comprising a grouping of contiguous tokens. At step 440, the semantic analyzer 150 tabulates a term value (n) for the term $(x_j)$ representing a total number of times the term occurs throughout the document.

For example, suppose a document 200 regarding the subject matter of lucid dreaming has terms that each occurs throughout the document 200. The term "dream state" is mentioned (e.g. individually occurs) two times. The term "lucid dream" is mentioned (e.g. individually occurs) eight times. The term "my dream" is mentioned four times, and the term "dream world" is mentioned only once. Each term is assigned a mention value for the total number of times the term individually occurs throughout the document 200. Thus, since the term "dream state" is mentioned (e.g. individually occurs) two times, the mention value for "dream state" is 2.

Among these terms, the token "dream" occurs in all of them, occurring a total of 15 times. The token occurrence value of a token, such as "dream", is the number of times that it occurs as part of a term among all the extracted terms for a document 200. Thus, the token occurrence value for "dream" is 15.

At step 450, the semantic analyzer 150 tabulates at least one mention offset for the term, the mention offset representing a position of an individual occurrence (i.e. mention) of the term in the document. For example, the term "lucid dream" is mentioned (e.g. individually occurs) eight times throughout the document 200, so the mention value for "lucid dream" is 8 (n=8). Each of the eight individual occurrences of "lucid dream" will have a mention offset representing its location in the document 200. The first occurrence of "lucid dream" will have a mention offset that represents an earlier position in the document 200 than the mention offset for the seventh occurrence of "lucid dream." Consequently, the seventh occurrence of "lucid dream" will have a mention offset that represents an earlier position in the document 200 than the mention offset for the eighth ($n^{th}$) occurrence of "lucid dream."

Figure 5:
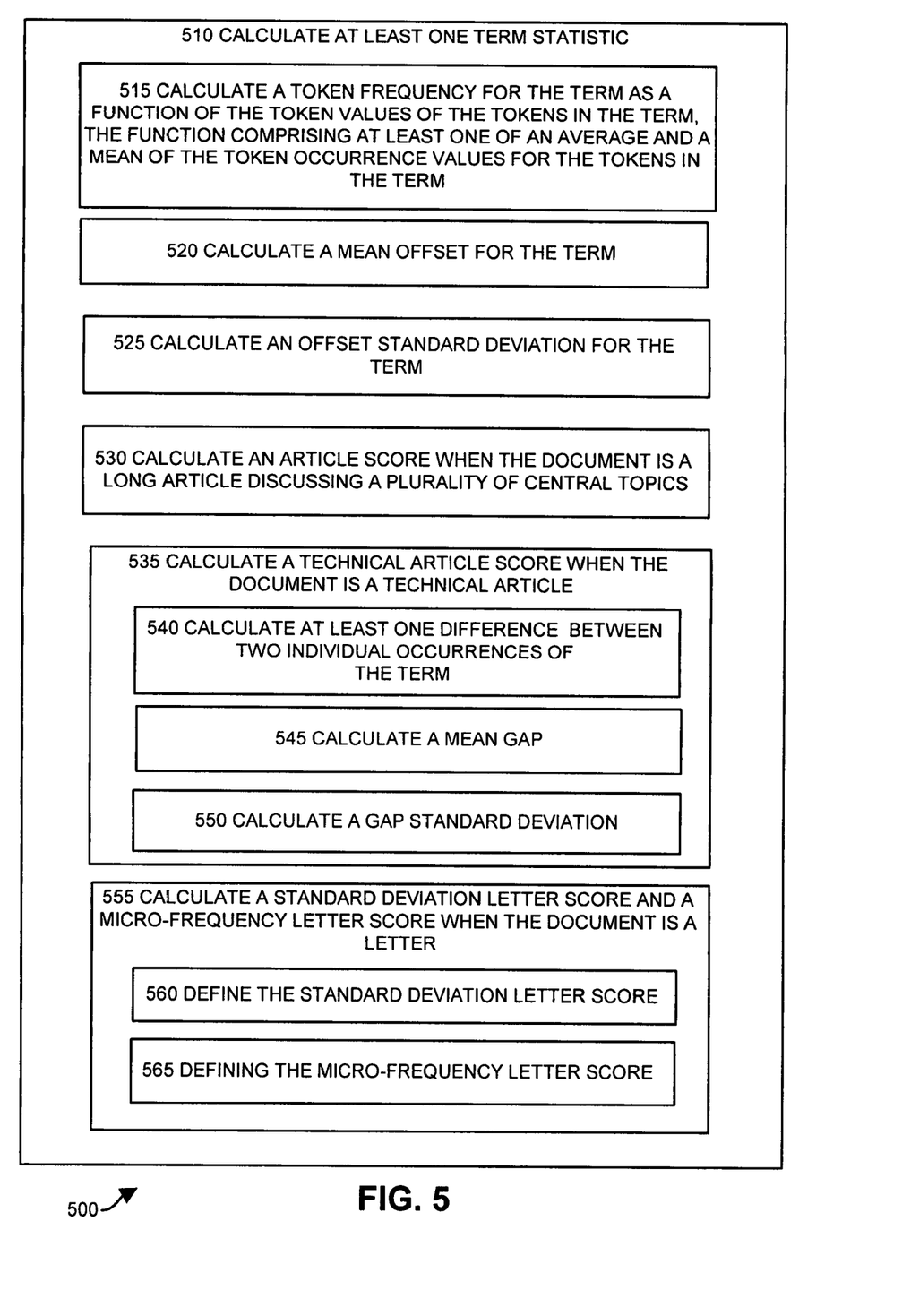
FIG. 5 is a flowchart of processing steps performed by the semantic analyzer for statistical processing of extracted text according to embodiments herein.

FIG. 5 is a flowchart 500 of processing steps 510-565 performed by the semantic analyzer 150 for statistical processing of extracted text according to embodiments herein. The objective of statistical processing of tokens and terms is to produce a score to rank each semantic term to help evaluate the suitability of the semantic term in returning content, such as a highly relevant advertisement. Flowchart 500 describes the best ranking algorithms for each document type. The steps in flowchart 500 relate to the statistic processor 150-4 as illustrated in the block diagram of FIG. 2. At step 510, the semantic analyzer 150 calculates at least one term statistic. It is understood that the following discussion for steps 515-565 describes one or more term statistics that can be calculated separately and concurrently—depending on the particular type of document 200.

At step 515, the semantic analyzer 150 calculates a token frequency ($tf(x_j)$) for the term as a function of the token values of the tokens in the term, the function comprising at least one of an average and a mean of the token occurrence values for the tokens in the term. For example, a term such as "dream state" has a token frequency that is a function of the token occurrence values for all of its tokens. Thus, "dream state" has a token frequency that is a function of the token values of "dream" (15) and "state" (2). The function used to compute the mean token frequency $tf(x_j)$ of a term $x_j$ ("dream state") is the average or mean of the respective token occurrence values, although any function may be used.

At step 520, the semantic analyzer 150 calculates a mean offset ($moffset(x_j)$) for the term. The mean offset for a term is defined by the following equation:

$$moffset(x_j) = \frac{1}{n}\sum_{i=1}^{n} offset(m_i)$$

It is understood that $offset(m_i)$ represents the mention offset for an individual occurrence (i.e. mention) of the term ($x_j$) within a set of n occurrences of the term throughout the document 200. Thus, the seventh occurrence of "lucid dream" out of eight total occurrences (n=8) will have a mention offset represented by $offset(m_7)$. It is understood that n can be equal to or greater than one (n=1).

Utilizing the mean offset, at step 525, the semantic analyzer 150 calculates an offset standard deviation ($soffset(x_j)$) for the term. The offset standard deviation is defined by the following equation:

$$soffset(x_j) = \sqrt{\frac{1}{n}\sum_{i=1}^{n}(offset(m_i) - moffset(x_j))^2}$$

At step 530, the semantic analyzer 150 calculates an article score ($ascore(x_j)$) when the document 200 is a long article discussing a plurality of central topics. The article score is defined by the following equation:

$$ascore(x_j) = \frac{n(soffset(x_j))\sqrt{tf(x_j)}}{\sqrt{moffset(x_j)}}$$

That is, for the article score, the numerator is the product of: the "macro-frequency" of to the term (as measured by the number of times (n) the term occurs in the document 200), the "scatter" of occurrences of these terms (as measured by the standard deviation of the positions of these occurrences), the "micro-frequency" of the term which is the square root of the token frequency of the term (as measured by the mean of the frequencies of the tokens in the document 200). This is reduced (e.g. divided) by the square root of the mean offset, due to an assumed uniformity of topic mentions.

In the $ascore(x_j)$ metric of step 530, the term frequency contributes positively and its tokens also contribute an average frequency, which has less impact due to its square root. Furthermore, the degree to which the term is scattered throughout the document (or mentioned frequently at the beginning and at the end) also contributes positively to the overall score.

At step 535, the semantic analyzer 150 calculates a technical article score ($tscore(x_j)$) when the document is a technical article. In contrast, the previous metric of step 530 ($ascore(x_j)$) used the standard deviation of the positions of terms in a document if the mentions of term are evenly distributed throughout the document 200. Then this value for $ascore(x_j)$ is maximal. However, for the technical article of step 535, terms can be half in the beginning of the document and half in the end, then the standard deviation is also maximal. Therefore, the technical score ($tscore(x_j)$) is maximal only when the mentions (e.g. individual occurrences) are evenly distributed throughout the document 200. The evenness of the distribution of the mentions of a term is therefore utilized, by taking the standard deviation of the differences between adjacent mentions of a term. The technical score is defined by the following equation:

$$tscore(x_j) = \frac{n}{rsdiff(x_j)}$$

At step 540, the semantic analyzer 150 calculates at least one difference (r) between two individual occurrences of the term. In particular, r is defined as one of the following equations: $r_1 = offset(m_i) - 0$, $r_i = offset(m_i) - offset(m_{i-1})$, and $r_{n+1} = doclen - offset(m_n)$. It is understood that doclen represents a total number of text and characters in the document 200.

At step 545, the semantic analyzer 150 calculates a mean gap ($r(x_j)$). The mean gap is defined by the following equation:

$$r(x_j) = \frac{1}{n}\sum_{i=1}^{n} r_i$$

At step 550, the semantic analyzer 150 calculating a gap standard deviation ($rsdiff(x_j)$). The gap standard deviation is defined by the following equation:

$$rsdiff(x_j) = \frac{1}{n} \sqrt{\sum_{i=1}^{n} (r_i - r(x_j))^2}$$

At step 555, the semantic analyzer 150 calculates a standard deviation letter score and a micro-frequency letter score when the document 200 is a letter (e.g. letter, e-mail, announcement). The standard deviation letter score assumes that the distribution of mentions (e.g. individual occurrences) of a term throughout a document 200 (as measured by the standard deviation of its mention offsets) is equally relevant as the number of times it occurs (n). In general, terms that are mentioned evenly throughout the document 200 will have maximal score, as will terms mentioned equally at the beginning and at the end. Terms that are mentioned frequently but in isolated sections will have lower weight. This is well suited for most e-mail, announcements and letters. The micro-frequency letter score includes a measure of "micro-frequency" which typically yields better results for documents that use more advanced or technical language.

At step 560, the semantic analyzer 150 defines the standard deviation letter score (sdlscore($x_j$)). The standard deviation letter score is defined by the following equation: sdlscore($x_j$) =n (soffset($x_j$)). At step 565, the semantic analyzer 150 defines the micro-frequency letter score (mflscore($x_j$)). The micro-frequency letter score is defined by the following equation: mflscore($x_j$)=n $\sqrt{tf(x_j)}$ (soffset($x_j$)).

It is understood that for faster computation, these formulas can be encapsulated in a set of relational database view definitions that use efficient implementations of text tokenization to compute token frequency. These view definitions can then be used to present and format the results of the calculations.

Figure 6:
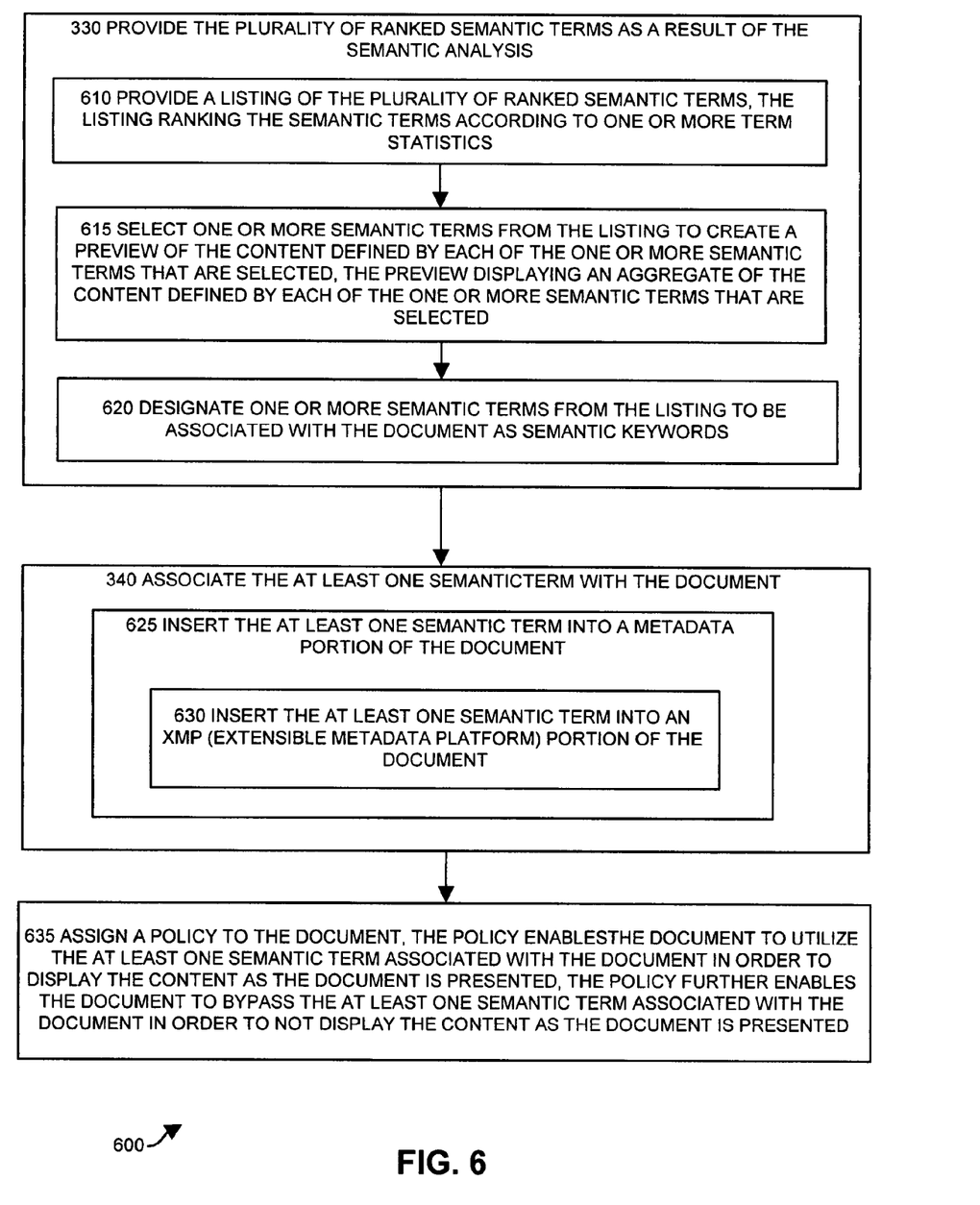
FIG. 6 is a flowchart of processing steps performed by the semantic analyzer for providing a ranked list of semantic terms and a content preview according embodiments herein.

FIG. 6 is a flowchart 600 of processing steps 610-635 performed by the semantic analyzer 150 for providing a ranked list of semantic terms and a content preview according embodiments herein. Certain steps in flowchart 600 relate to the reporting component 150-5 as illustrated in the block diagram of FIG. 2. Additionally, details of step 330 for providing the plurality of ranked semantic terms as a result of the semantic analysis are elaborated in steps 610-620.

At step 610, the semantic analyzer 150 provides a listing of the plurality of ranked semantic terms, the listing ranking the semantic terms according to one or more term statistics. For example, a user interface (e.g. a G.U.I., web browser) can display and summarize results of the statistical ranking algorithms listed. In the user interface, semantic terms (based on the extracted text) can be shown with its respective term statistics. It is understood that the listing of ranked semantic terms 210 is sortable and can be manipulated by the user to adjust the ranking results.

At step 615, the semantic analyzer 150 selects one or more semantic terms from the listing to create a preview of the content (e.g. a pop-up window, G.U.I., web browser) defined by each of the one or more semantic terms that are selected, the preview displaying an aggregate of the content defined by each of the one or more semantic terms that are selected. Specifically, the ranked semantic terms listed in the user interface are enabled so that the defined content (e.g. the actual ads) can be presented to determine the usefulness of the selected semantic term.

For example, the user can select two terms from the listing of ranked semantic terms 210. In response to such a selection, the semantic analyzer 150 can create the content preview 220 and display the content (e.g. advertisements) that is defined by the selected semantic terms. In one embodiment, if the selected semantic terms from the listing of ranked semantic terms 210 are "Chemical Engineering" and "college," then the content preview 220 displays the advertisements associated with "Chemical Engineering" and "college" so the user can decide if the semantic terms "Chemical Engineering" and "college" provide desirable advertisements to warrant designating "Chemical Engineering" and "college" as semantic keywords for the document 200. If the user determines that the content preview 220 for selected semantic terms is acceptable, the semantic analyzer 150 provides the user with functionality create keywords for the document 200. Specifically, at step 620, the semantic analyzer 150 designates one or more semantic terms from the listing to be associated with the document 200 as a semantic keyword.

Details of step 340 for associating the at least one semantic term with the document 200 include, at step 625, the semantic analyzer 150 inserting the at least one semantic term into a metadata portion of the document. At step 630, the semantic analyzer 150 inserts the at least one semantic term into an XMP (Extensible Metadata Platform) portion of the document. It is understood that the Extensible Metadata Platform, or XMP, is a specific type of extensible markup language used in PDF, photography and photo editing applications. XMP defines a metadata model that can be used with any defined set of metadata items. XMP also defines particular schemas for basic properties useful for recording the history of a resource (e.g. document) as it passes through multiple processing steps, such as, from being photographed, scanned, or authored as text, or through photo editing steps (such as cropping or color adjustment), to assembly into a final image. XMP can allow each software program or device along the way to add its own information to a digital resource (e.g. document), which can then be retained in the final digital file.

At step 635, the semantic analyzer 150 assigns a policy to the document 200. The policy enables the document 200 to utilize the at least one semantic term associated with the document 200 as a semantic keyword in order to display the content as the document 200 is presented. In the alternative, the policy enables the document 200 to bypass the at least one semantic term associated with the document 200 in order to not display the content as the document 200 is presented.

Note again that techniques herein are well suited for a semantic analyzer configured to automatically analyze a document and provide a ranked list of semantic terms (based on extracted text) that reflect the theme and topics of the document. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method comprising:
   extracting, by a processor, text from a document;
   identifying, by the processor, terms within the extracted text, each of the terms comprising a contiguous grouping of two or more tokens, each token comprising a word;

determining, by the processor, a token value representing a total number of times each token occurs in the document;

determining, by the processor, a token frequency for each of the terms as a function of the token values of tokens in each of the terms; and ranking, by the processor, the terms using the token frequency determined for each of the terms.

2. The method of claim 1 wherein the function determines a mean of the token values of tokens in each of the terms.

3. The method of claim 1 further comprising determining a term value for each of the terms representing a total number of times each of the terms occurs in document, wherein ranking the terms further comprises using the term value for each of the terms.

4. The method of claim 1 further comprising determining a standard deviation of offset for each of the terms using positions of individual occurrences of each of the terms in the document, wherein ranking the terms further comprises using the standard deviation of offset for each of the terms.

5. The method of claim 4 wherein determining the standard deviation of offset for each of the terms comprises determining a mean offset for each of the terms.

6. The method of claim 1 further comprising determining a standard deviation of gap for each of the terms using differences between positions of individual occurrences of each the terms, wherein ranking the terms further comprises using the standard deviation of gap for each of the terms.

7. The method of claim 6 wherein determining the standard deviation of gap for each of the terms comprises determining a mean gap for each of the terms.

8. The method of claim 1 further comprising:
providing a listing of ranked terms;
receiving selections of one or more terms from the listing to create a content preview of additional content identified using the selections of one or more terms; and
receiving designations of terms from the listing to be associated with the document as one or more keywords.

9. The method of claim 1 further comprising:
providing a listing of ranked terms;
receiving designations of terms from the listing to be associated with the document as one or more keywords; and
associating the one or more keywords with the document.

10. The method of claim 9 further comprising inserting the one or more keywords into a metadata portion of the document.

11. The method of claim 1 wherein the function determines an average of the token values of tokens in each of the terms.

12. A computer-implemented method comprising:
extracting, by a processor, text from a document;
identifying, by the processor, terms within the extracted text, each of the terms comprising a contiguous grouping of two or more tokens, each token comprising a word;

determining, by the processor, a standard deviation of offset or gap for each of the terms using positions of individual occurrences of each of the terms in the document; and ranking the terms using the standard deviation of offset or gap for each of the terms.

13. The method of claim 12 wherein determining the standard deviation of offset for each of the terms comprises determining a mean offset for each of the terms.

14. The method of claim 12 wherein determining the standard deviation of gap for each of the terms comprises determining a mean gap for each of the terms.

15. The method of claim 12 further comprising:
providing a listing of ranked terms;
receiving selections of one or more terms from the listing to create a content preview of additional content identified using the selections of one or more terms; and
receiving designations of terms from the listing to be associated with the document as one or more keywords.

16. The method of claim 12 further comprising:
providing a listing of ranked terms;
receiving designations of terms from the listing to be associated with the document as one or more keywords; and
associating the one or more keywords with the document.

17. The method of claim 16 further comprising inserting the one or more keywords into a metadata portion of the document.

18. A non-transitory computer-readable medium on which is encoded program code, the program code comprising:
program code for extracting text from a document;
program code for identifying terms within the extracted text, each of the terms comprising a contiguous grouping of two or more tokens, each token comprising a word;
program code for determining a token value representing a total number of times each token occurs in the document;
program code for determining a token frequency for each of the terms as a function of the token values of tokens in each of the terms; and
program code for ranking the terms using the token frequency determined for each of the terms.

19. A non-transitory computer-readable medium on which is encoded program code, the program code comprising:
program code for extracting text from a document;
program code for identifying terms within the extracted text, each of the terms
comprising a contiguous grouping of two or more tokens, each token comprising a word;
program code for determining a standard deviation of offset or gap for each of the terms using positions of individual occurrences of each of the terms in the document; and
program code for ranking the terms using the standard deviation of offset or gap for each of the terms.

* * * * *